Jan. 18, 1955

C. E. GILBERT 2,699,574

MOLDING MACHINE FOR MOLDING PLASTIC ARTICLES

Filed Dec. 4, 1950

INVENTOR
Charles E. Gilbert
BY
Darby & Darby
ATTORNEYS

Jan. 18, 1955  C. E. GILBERT  2,699,574
MOLDING MACHINE FOR MOLDING PLASTIC ARTICLES
Filed Dec. 4, 1950  11 Sheets-Sheet 3

Fig.3.

INVENTOR
Charles E. Gilbert
BY Darby & Darby
ATTORNEYS

Jan. 18, 1955  C. E. GILBERT  2,699,574
MOLDING MACHINE FOR MOLDING PLASTIC ARTICLES
Filed Dec. 4, 1950  11 Sheets-Sheet 6

INVENTOR
*Charles E. Gilbert*
BY
*Darby & Darby*
ATTORNEYS

Jan. 18, 1955

C. E. GILBERT 2,699,574

MOLDING MACHINE FOR MOLDING PLASTIC ARTICLES

Filed Dec. 4, 1950

INVENTOR
*Charles E. Gilbert*
BY *Darby & Darby*
ATTORNEYS

Jan. 18, 1955

C. E. GILBERT 2,699,574

MOLDING MACHINE FOR MOLDING PLASTIC ARTICLES

Filed Dec. 4, 1950

INVENTOR
Charles E. Gilbert
BY
Dailey & Dailey
ATTORNEYS

United States Patent Office 2,699,574
Patented Jan. 18, 1955

2,699,574
MOLDING MACHINE FOR MOLDING PLASTIC ARTICLES

Charles E. Gilbert, New York, N. Y.; Margaret Doris Gilbert, Norman Coates, and The Chase National Bank of the City of New York, executors of said Charles E. Gilbert, deceased, assignors to Gilbert Manufacturing Co., Inc., Long Island City, N. Y., a corporation of New York Application December 4, 1950, Serial No. 199,034

24 Claims. (Cl. 18—20)

The present application is a continuation-in-part of my prior copending application of the same title, filed January 16, 1946, as Serial No. 641,519, now abandoned.

The invention relates to an automatic molding machine designed for the continuous automatic production of molded plastic articles.

The main object of the invention is to provide a machine with mechanism adapted to automatically mold plastic articles of a predetermined shape and construction.

Another object is to provide an improved loading mechanism for an automatic molding machine.

Yet another object of the invention is to provide an improved finished-product extracting mechanism for an automatic molding machine.

A further object of the invention is to provide a machine for automatically molding plastic articles and which is provided with mechanisms operating in timed relation to each other to automatically feed molding material in predetermined amounts to molding units of the machine; to mold the plastic articles of a predetermined design and construction; to flash off the molded article after it has been molded; and to discharge the completed molded article from the machine.

Another object of the invention is to provide a machine with mechanism adapted to automatically mold one piece insulated plug bodies adaptable for use in constructing electrical connectors.

A further object is to provide a machine adapted to produce molded hollow plug bodies for use in constructing electrical connectors, and which during the molding operation thereof provides the plug bodies with molded recesses on the interior thereof which are adapted to receive and hold the contact elements of the connector, and which also provides the plug body with a central aperture for the insertion of an electrical conductor.

A further object is to provide a machine for automatically molding one piece electrical plug bodies and which is provided with mechanisms operating in timed relation to each other to automatically feed molding material in predetermined amounts to molding units of the machine; to mold the plug bodies of a predetermined design and construction; to punch a central aperture through the molded plug bodies; to flash off the molded body; and to discharge the completed molded plug bodies from the machine.

Other objects and advantages of the invention will be apparent during the course of the following detailed description.

In the accompanying drawings forming a part of this specification, and wherein similar reference characters designate corresponding parts throughout the several views:

Figure 7 is a sectional view of Figure 6 taken on the line 7—7 thereof;

Figures 17 and 18 are detail views showing two positions of the ejector means;

For the purpose of a clear understanding of my invention I have illustrated and will describe the same as it is applied to a machine which is adapted to produce molded one piece insulated plug bodies adaptable for use in constructing electrical connectors. It should be understood, however, that a machine made in accordance with the invention may be readily made adaptable for use for automatically molding plastic articles of many other kinds by merely changing the form and shape of the molding units employed therein, and by slight variations of the form and shape of the parts that cooperate with said molding units, and the invention is not to be restricted to the specific machine shown and described herein for making molded plug bodies for electrical connectors.

The machine as illustrated in the drawings is particularly adapted to automatically produce molded plug bodies of a type such as are illustrated and described in my United States Letters Patents Nos. 2,012,627; 2,060,617; 2,183,016; 2,229,288 and 2,283,889. In these patents electrical connectors are shown which are comprised of a one piece plug body molded from a suitable insulating material and in which two specifically constructed electrical contact elements are mounted. The electrical connectors are adapted to be assembled by merely pushing the contact elements into recesses formed in the molded plug body. The contact elements when thus mounted in said recesses become locked in position with respect to the plug body. The plug bodies shown in these patents are also provided with an aperture communicating with the interior thereof and through which an electrical cord or conductor is inserted and held in electrical contact with the contact elements.

Referring to the drawings, it is to be understood that the machine of my invention may be mounted on any suitable base support. The support illustrated will not be particularly described but will be merely indicated in the drawings by the numeral 1. Mounted on this base support are other supporting elements which are shown in the several views and which serve to support the several operating mechanisms of the machine. These supporting elements will also not be described in detail and will only be referred to whenever it is necessary to make clear the position, construction and operation of said mechanisms.

In describing the machine, it is believed that its construction and operation will be more readily understood if there is first generally pointed out the manner in which the operating power is transmitted to the several mechanisms so that they will operate in timed relation to each other, and then set forth the construction and operation of said mechanisms.

The means for transmitting power to the several shafts, cams, and other operating mechanisms of the machine are shown particularly in Figures 1, 2, 3 and 4 of the drawings. The operating power is derived from a suitable electric motor A, which is mounted on a support 2, extending from the base support 1. The motor is provided with a variable speed pulley B, which is connected to a shaft C, by a V-belt B', over a variable speed pulley D, mounted on shaft C. On the shaft C, behind the pulley D, is a spur gear pinion E (shown in dotted lines in Figure 2). The spur gear pinion E engages and runs with the gear F, mounted on the shaft G. On the shaft G, is a worm (not shown) which drives a wormwheel J, upon which is mounted the main body of the revolving molding drum which will be described more in detail later on herein. The shafts C, and G, run on ball bearing pillow blocks such as are indicated at G'. The worm on shaft G is covered by a casing H, and is lubricated by the oil drip method from an oil reservoir H'.

At the end of shaft G, there is mounted a worm K, which cooperates with and drives a wormwheel L, which is mounted on the end of the shaft M. The shaft M, is rotatively supported on the framework of the machine in suitable pillow blocks $M^1$, $M^2$ and $M^3$. The worm K and wormwheel L, may be enclosed in a protective housing K' (see Figure 4). On the shaft M there are mounted two eccentric cams N and O. The cam N operates to motivate a pull down device, indicated generally by P, for the molding mechanism which is positioned on the molding drum 27 and which will be described more in detail hereinafter. The cam O operates a pull down mechanism, indicated generally at O, which effects a gas release in the molding units and which will also be described later on herein.

At the other end of shaft M (see Figure 4) is mounted a bevel gear S, which transmits power to bevel gear T mounted on vertical shaft U. A spiral gear V, mounted on shaft U, cooperates with and transmits power to a spiral gear W, mounted on shaft X. On the shaft U, there are also mounted two cams that ride inside of a follower cage box Y, which pivots on a shaft Z.

The mechanism for feeding molding powder to the molding mechanism of the machine, and the operation thereof, is as follows:

Insulating molding powder, for molding the plug bodies, is fed from a supply source 3, mounted over the machine, to a feeding hopper 4. The feeding hopper is positioned so that it rides along the top surface of a feeding bar 5. The feeding bar is positioned to have sliding engagement in a guideway 6, secured on and supported by a portion of the machine framework 7. Also secured to said framework is a support 8, provided with a top arm 8'. Mounted on the arm 8' and secured thereto by a suitable bolt 9 and nuts 9', and by bolt 14, and a wing nut 10, is an adjustable plate member 11, which supports the feeding hopper 4, over the feeding bar 5. The plate member is provided with the slots 12 and 13, through which the bolt for wing nut 10 and the bolt 9 extend. The purpose of this construction is so that the plate member 11, may be adjusted with respect to the arm 8', and so that the powder feeding hopper 4, may be shifted to a non-filling position if desired. The plate member 11, is also provided with an adjustment member 15, through which an adjustment screw 16 extends. The end of said screw abuts against the support 8 and by turning the screw, the position of the plate member 11, with respect to arm 8' may be readily adjusted.

Figure 6:
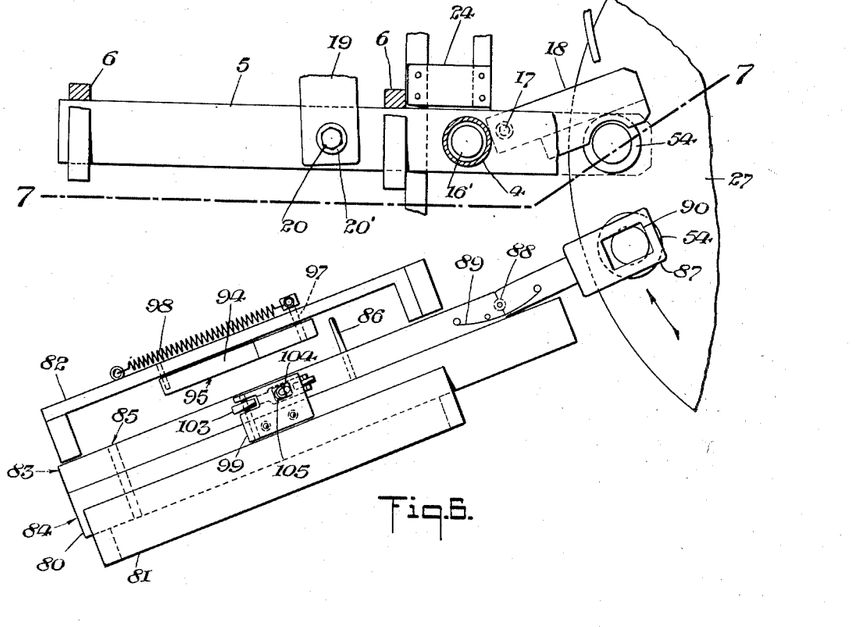
Figure 6 is a detail plan view of the feeding and discharge mechanism of the machine.

The feeding bar 5 is provided with a hole 16' therethrough at its inner end, and the molding powder in the feeding hopper 4 drops into said hole when the feeding bar 5 is moved toward the molding mechanism of the machine. Pivotally secured to the under face of the feeding bar 5 is a cover plate 18, which normally is positioned so that it will cover the bottom of the hole 16' and will thus prevent the molding powder fed into the hole from dropping out. The cover plate 18 is positioned so that it will be pushed aside by the upper end of the sleeve member 54 of the molding mechanism as the feeding bar is moved towards the molding drum, as shown in Figure 6. A block 24, secured to the supporting frame of the machine, and positioned adjacent to the feeding bar 5, causes the cover plate 18 to be returned to its normal position as the feeding bar is returned from its feeding position with respect to the molding drum.

The movements of the feeding bar 5, towards and from the molding drum, are effected by the operating lever 19, which is pivotally secured to said bar by a bolt 20 and the nuts 20'. The operating lever is pivotally secured to the shaft Z mounted on the supporting framework of the machine, and at its other end there is provided a follower cage box Y, in which is positioned a cam (not shown) which is secured to, and revolves with, the shaft U. The rotation of shaft U causes the cam to hit the sides of the follower cage box Y, and there is thus provided a rocking movement of lever 19 and said lever will thus move the feeding bar 5 in its guideway 6 towards and from the molding drum.

The feeding hopper 4, which is supported over and rides along the top face of the feeding bar 5, is held in resilient contact with the feeding bar, by means of the spring 23, which is positioned between the top of the feeding hopper and the lower face of the adjustment plate 11.

Figure 8:
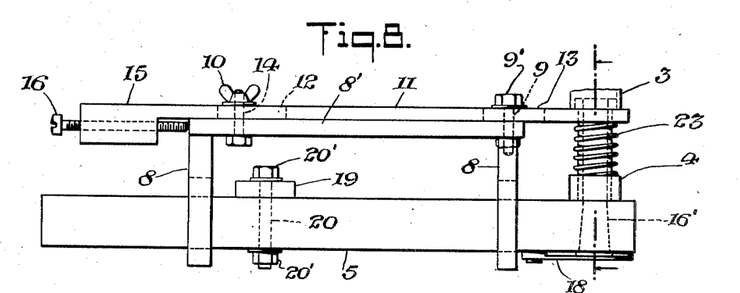
Figure 8 is a view similar to Figure 7 but showing the feeding hopper in loading position.

The operation of the feeding mechanism will be readily apparent from Figures 6, 7 and 8 of the drawings. In Figure 7, the feeding hopper 4, filled with molding powder, is shown positioned on the upper face of the feeding bar 5, in its feeding position with respect to the sleeve 54 of one of the molding units mounted on the molding drum. As lever 19 moves the feeding bar 5 away from the molding drum the bar 5 is drawn backwardly to a point where the feeding hopper 4 is brought above the hole 16' in said bar, and the insulating powder in the hopper will drop into said hole where it is retained therein by the cover plate 18. Upon the next movement of the feeding bar towards the molding drum, the cover plate is pushed aside by the top edge of the sleeve 54 of a molding unit which is to be filled with the powder as said sleeve and molding unit is rising upwardly towards the die member 44, of the molding mechanism. As the cover plate is brushed aside the hole 16' of the feeding bar arrives in position over the sleeve 54 of the molding unit and the molding powder therein is dropped into said sleeve 54 and then the lever 19 immediately returns the feeding bar from the molding drum. After the hopper 4 has delivered its charge of molding powder to the hole 16' in the feeding bar, and it again is riding across the top surface of the bar when the bar is withdrawing from the molding drum, it is automatically filled with more molding powder from the supply source 3, and is again ready to deliver the powder to the aperture 16' in the feeding bar on the next movement of the bar towards the molding drum.

The construction and operation of the molding drum and the construction and operation of the molding units mounted thereon is as follows:

The molding units of the machine are carried by a hollow cylindrical drum indicated generally by the numeral 27. The drum is provided with a sleeve 28 at its lower end which surrounds a shaft 28'. The shaft 28' is rotatably mounted in the base of the machine. The drum is rotated with respect to the base portion by means of the worm wheel J, which extends around the drum and which is driven by a worm on shaft G, as previously explained.

The drum is formed with a hollow top section 29; a reduced portion 30; an intermediate section 31; a reduced portion 32; a section 33 around which the wormwheel J is mounted; a reduced portion 34; a section 35 through which the bottom portions of the molding units extend; and a base portion 36.

Mounted within the central portion of the hollow drum body is a suitable electrical heating unit 37 which supplies heat to the drum and the molding mechanism. The electrical connectors for said heating unit are indicated at 38 and 39 (see Figure 2). These connectors extend downwardly through the drum body and through the hollow sleeve 28 and suitable brushes are provided which bear against the sleeve 28 and the shaft 28' to conduct electrical current to the heating unit from the conductors 41 and 42 mounted on the support 40. The conductors 41 and 42 are supplied with electrical current from a suitable electrical source.

Slidably supported in the base portion 43' of the cylindrical top section of the hollow drum body, and so that they will project downwardly around said base portion and into the cutaway section formed by reason of the reduced portion 30 of the drum, are a plurality of die members 44, which are used in the molding operation of the plug bodies. These die members are slidably maintained on rods 45 which are mounted in a support member 46 suitably positioned in the top section of the drum body. The die members are resiliently held against movement on the rods 45 by the springs 47 which are positioned between the lower side of the support 46 and the die members.

Mounted around the exterior of the drum body, and slidingly extending through, and supported by, the intermediate section 31, the section 33 and section 35 of said body, are molding units, indicated generally in the drawings by the numeral 48. The molding units 48 cooperate with the die members to form the molded plug bodies. The lower ends of the molding units 48 carry rollers 49 which are mounted on pins 50. These rollers are adapted to travel around a cam runway 51 which is positioned around the drum body at the base of the machine.

Figure 13:
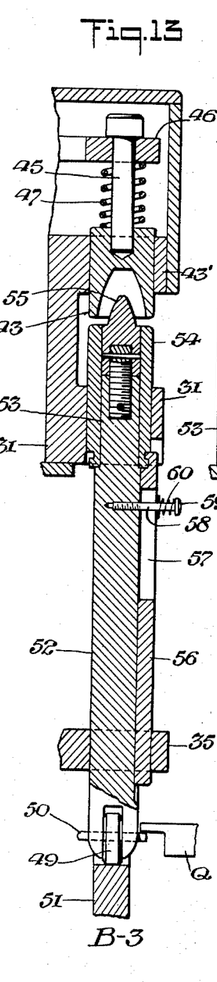
Figures 13, 14, 15 and 16 are vertical sectional views of the die plungers which are shown in Figure 5.
Figures 14, 15, 16:
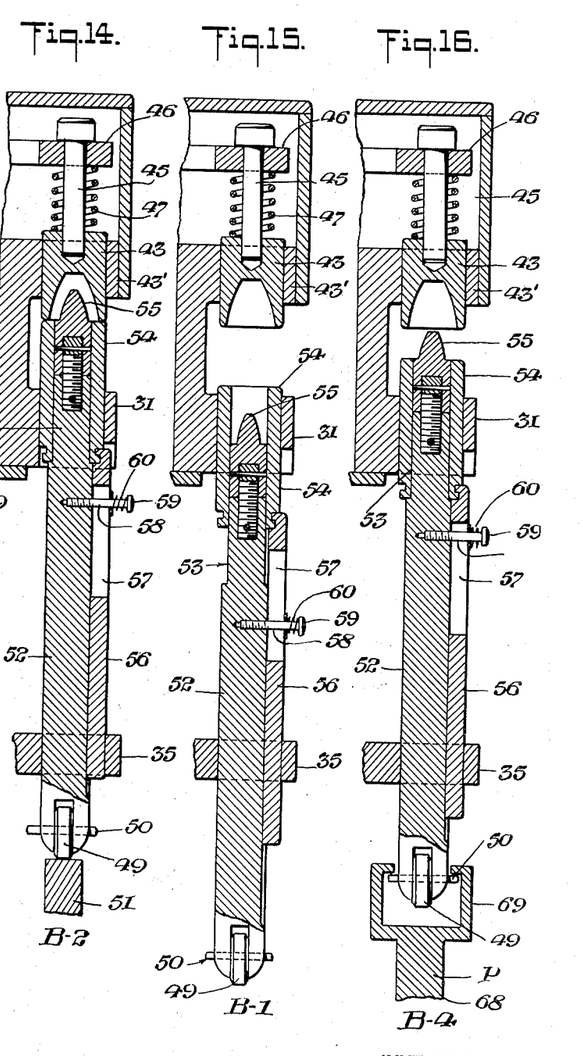

As shown in Figures 13–16, the molding units 48 are comprised of a cylinder portion 52 which is formed with a reduced upper end portion 53. Secured to the reduced upper end portion is a force piece 55, which is adapted to be projected upwardly into a die member 43 when the molding of a plug body takes place and functions to shape the interior of said plug body. The upper end 53 of cylinder 52 is provided with a sliding engagement within a sleeve 54. The sleeve 54 in turn is slidingly supported in openings formed in the intermediate section 31 of the drum body and its upper edge, at the start of its upward movement towards the die member 43 (as shown in Figure 15) projects slightly above the top surface of the intermediate section 31 of the drum body. Secured to the sleeve 54 is a sleeve member 56 which is positioned so as to have sliding engagement with the cylinder 52. The sleeve member 56 is provided with a slot 57 which receives therethrough a screw pin 58 which is mounted in the cylinder portion 52. The screw pin is held in said slot by the head portion 59. The pin is maintained in resilient contact with the sleeve member 56 by means of a spring 60, and when the screw is tightened with respect to member 56, the sliding action of said sleeve member with respect to the cylinder 52 can be regulated.

Figure 1:
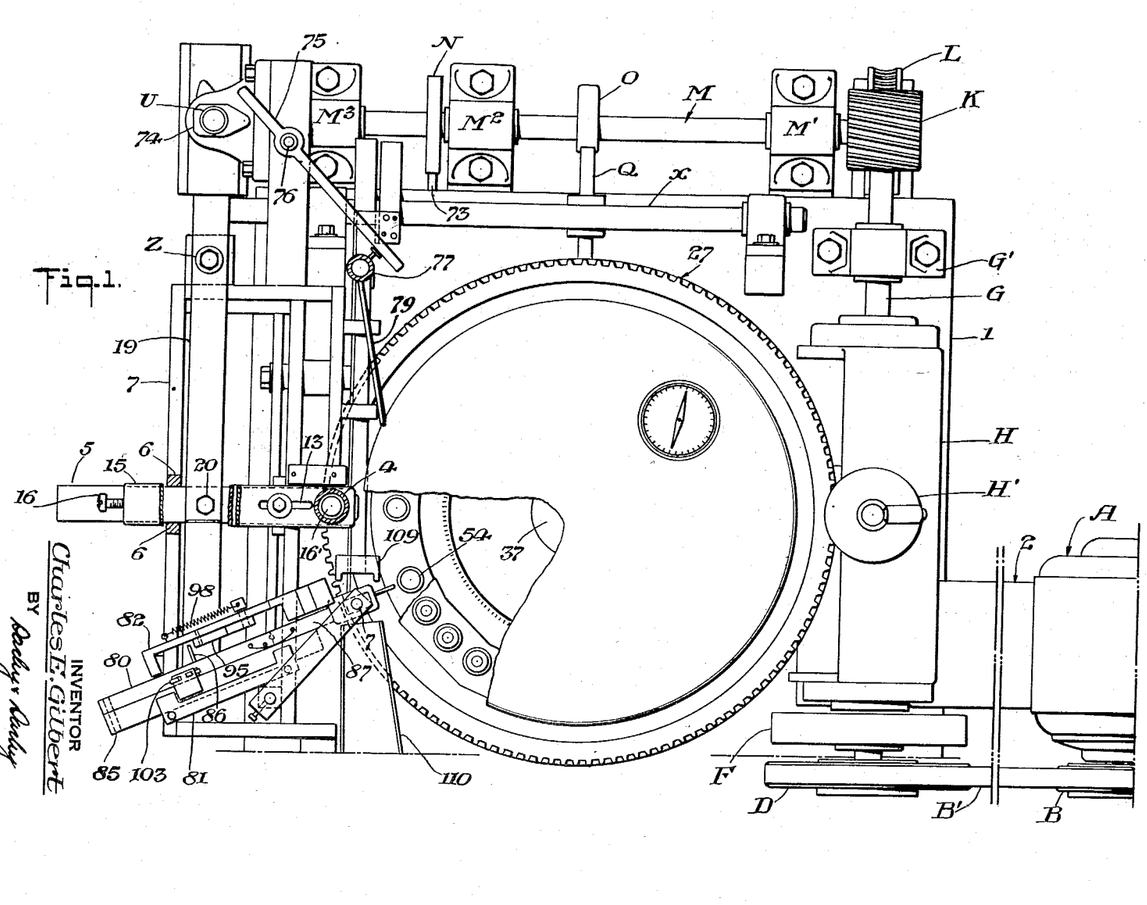
Figure 1 is a top plan view of a machine constructed in accordance with my invention.
Figure 2:
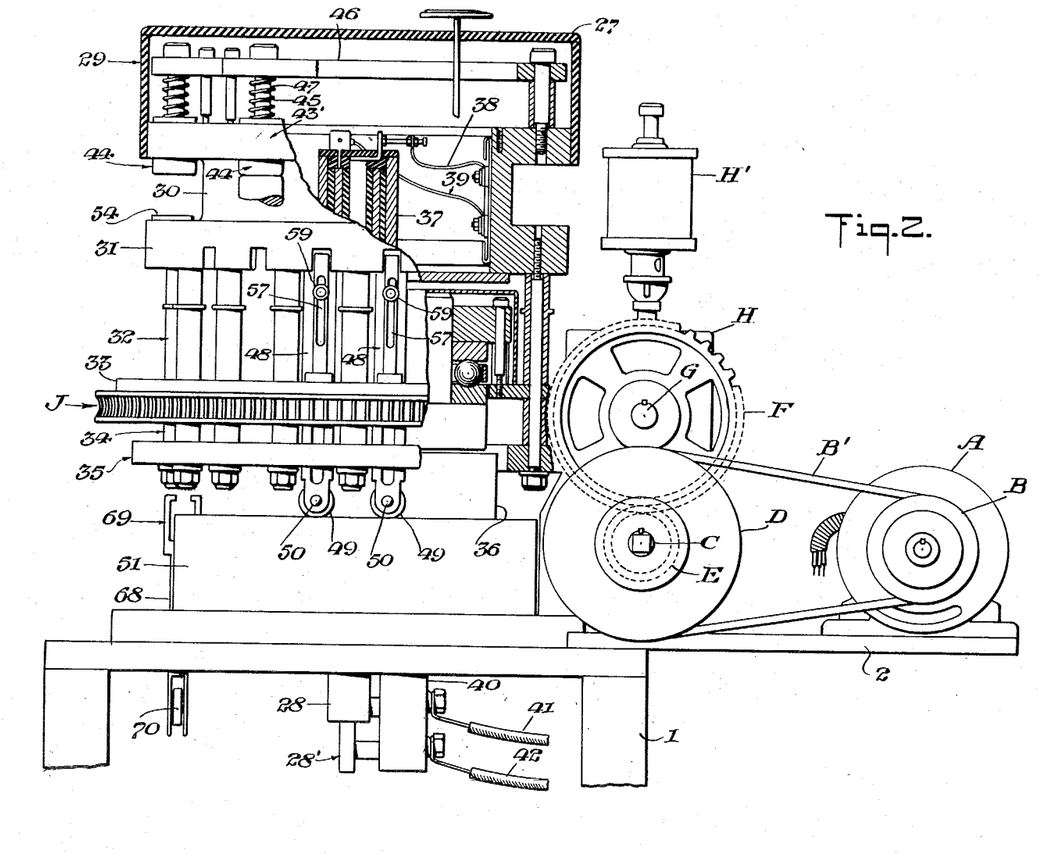
Figure 2 is a view in elevation of the right hand side of the machine with portions thereof broken away to more clearly show the construction and arrangement of the interior of the molding cylinder.
Figure 5:
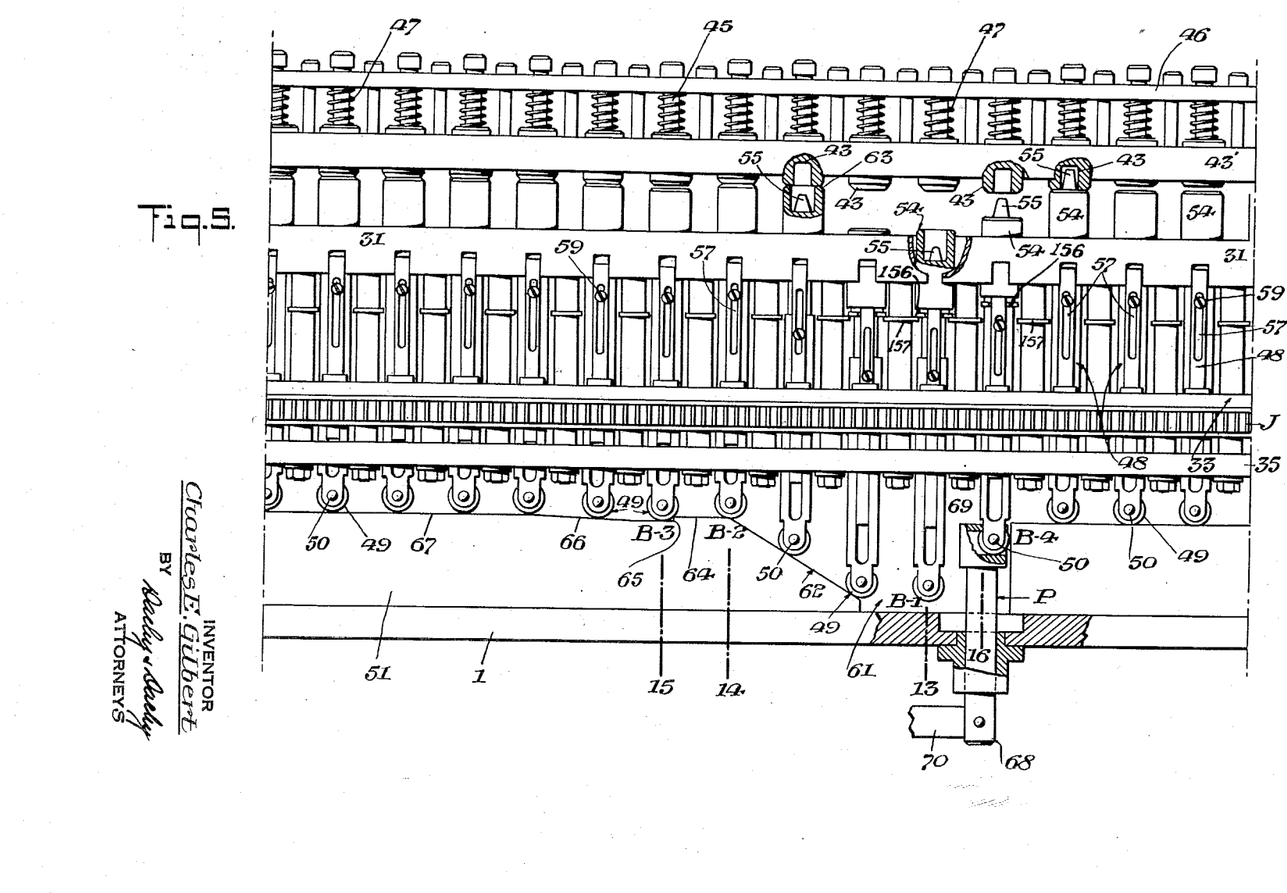
Figure 5 is a flattened or developed view of the molding cylinder and showing the die plungers used in forming the molded plug bodies in various stages of their operation.
Figures 12, 22:
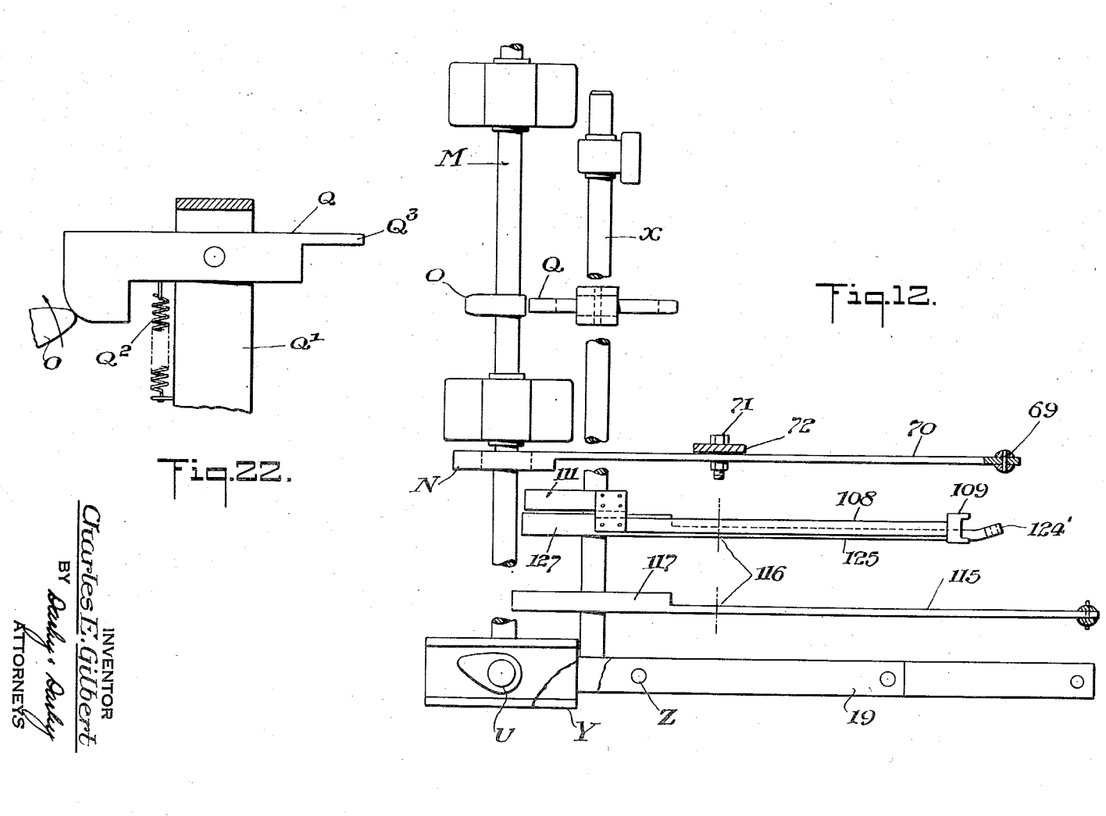
Figure 12 is a plan view of the several levers which operate the charging and ejecting mechanism.
Figure 22 is a detail view showing the cam actuated trigger position at the de-gassing station.
Figure 12:
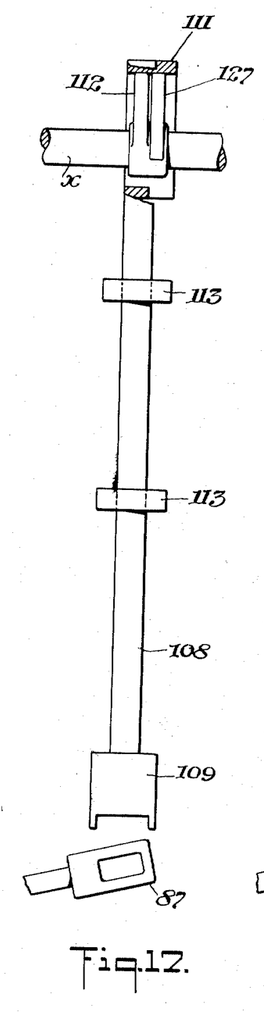

Referring to Figures 5, 13, 14, 15 and 16, the cycle of operation of the molding mechanisms mounted on the drum body is as follows:

The molding powder for molding the plug body is fed into the sleeve 54 of one of the molding units by the feeding mechanism, previously described, at the time when said sleeve is in the position B–1 shown in Figures 5 and 15. At that position, the upper reduced portion 53 of the cylinder 52 which carries the force piece 55, has been drawn down into the sleeve by the action of a pull down mechanism to be more fully described, and said molding unit is riding across a cut-away portion 61 in the cam runway 51 (see Figure 5) during the rotation of the drum body. The roller 49 of the cylinder 52 then engages the inclined portion 62 formed in the cam runway and moves up the same. As the roller advanced up the incline 62, the cylinder 52, together with its sleeve 54, is forced upwardly towards the die member 43, until the top edge of the cylinder sleeve 54 abuts against the lower edge of the die member as shown in Figure 5. When the cylinder 52 and its sleeve 54 reach this point in the operation of the molding mechanism, and as the roller 49 of the cylinder continues up the incline of the cam runway 51, the reduced portion 53 of the cylinder 48 is forced upwardly into the sleeve 54, against the resistance placed on the cylinder by the sleeve member 56, and the molding powder in the sleeve is forced upwardly into the die member as indicated by the position B–2 shown in Figure 14. The roller on the lower end of the cylinder 52 then proceeds for a short distance along a level portion 64 of the cam runway 51 until it reaches a depressed portion 65, where the roller 49 is caused to be dropped to the depressed portion. This action is accomplished by mechanism shown in Figures 3, 13 and 22. In Figures 1 and 22 it will be seen that the cam O, as it revolves on shaft M, causes a pull down lever Q to rock on a pivot in support Q¹ and against the action of spring Q². The rocking action of lever Q causes its end Q³ (as shown in Figure 13) to strike the pin 50 of the roller of cylinder 48 as said roller reaches the depressed point 65 on the cam runway 51. Thus the cylinder 52 with its sleeve 54 is forcibly caused to be slightly withdrawn downwardly away from the die member to the position B–3 shown in Figure 13. Thus any gas which has accumulated in the die is permitted to escape therefrom. The roller 49 in the bottom end of the cylinder 52 then continues up a slight incline 66 until it reaches the level portion 67 of the cam runway, at which point the cylinder and its sleeve are again positioned in molding relation with respect to the die member as indicated in Figure 14. The cylinder and die member then revolve with the drum body in this relation until the plug body has been fully molded, and until the roller of the cylinder reaches the point where the cut away portion 61 in the cam runway is positioned (see Figure 5). At that point the pull down mechanism designated generally by the letter P, grasps the ends of the pin 50 upon which the roller of the cylinder is mounted, and pulls the cylinder and its sleeve away from the die member and so that it will be in the position B–4, shown in Figures 5 and 16. The pull down mechanism then continues to pull the cylinder downwardly with respect to its sleeve until it reaches the position B–1 shown in Figure 15. The pull down mechanism P engages the roller 49 (Figs. 13–16) which is pivotally attached to the cylinder 52 to which the force member 55 is fixed, so that the pull down mechanism directly pulls down the force member 55. At the same time, the sleeve 54 is frictionally engaged with cylinder 52 by means of sleeve member 56, screw 57 and spring 60, so that sleeve 54 is pulled down together with force member 55 until a shoulder 156 on sleeve member 56 (Fig. 5) strikes a fixed abutment 157 on the frame structure 32 retaining the rings 31, 33, 35 in position. Thereupon cylinder 52 continues to descend, while sleeve 54 is stationary, causing the force member 55 to retract within sleeve 54 as shown in Fig. 15. During the molding process of plug bodies, the above described cycle of movements is repeated in a continuous operation of the molding machine.

The mechanism designated generally by the letter P, for pulling the cylinders 52 downwardly away from the die members 44, as above referred to, is comprised of a pull down lever 68, having a pull down member 69 at its free end. The pull down lever is secured to one end of a lever 70 which is pivoted at 71 to a support 72 on the framework of the machine. The other end of the lever 70 is pivotally secured to a lever 73 which extends upwardly to shaft M (see Figures 1 and 3) where movement is imparted thereto by the cam N. The movement transmitted to levers 68, 70 and 73 by the cam N causes the pull down member 69 to move up and down and to grasp the pin 50 of the roller of each cylinder 48, as the roller approaches the cut away portion in the cam runway, and pull the cylinder down into the cut away portion 61.

Mounted on shaft U, is a cam 74 which actuates a lever 75, pivoted at 76. The lever 75 operates to open and close an air valve 77 permitting the escape of compressed air derived from a suitable supply source 78 through a conduit 79, to remove any excess molding powder which may have fallen on the drum body during the filling of the sleeves 54 of the cylinders 56.

Figures 9, 10, 11:
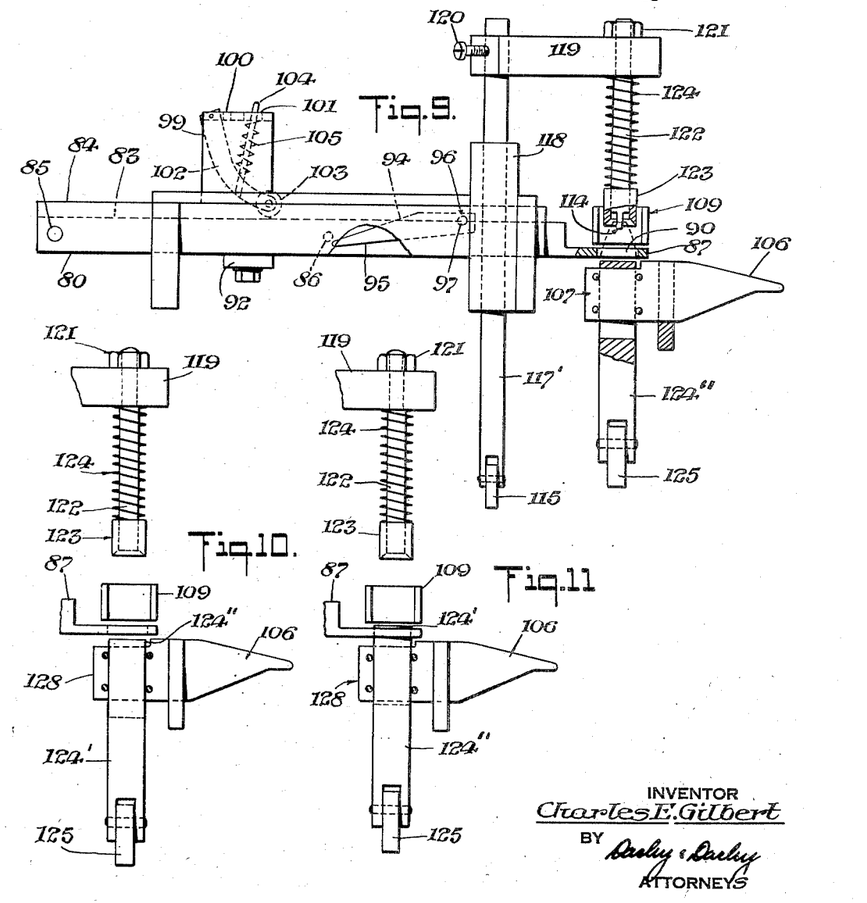
Figure 9 is a detail view of the ejector and punch mechanism of the machine.
Figures 10 and 11 are detail views showing various positions of the punches.

The mechanism for discharging the completed molded plug body from the machine is designated generally by the numeral 80 in Figures 1, 6 and 9 of the drawings. This mechanism is positioned to slide in guideways 81 and 82 secured to the supporting framework of the machine. The mechanism comprises the arms 84 and 83 which are pivoted to each other at 85. The arm 84 serves as a guide and support for the arm 83 as it is moved through the guideways 81 and 82. The inner end of arm 83 is provided with an extension 87 which is pivoted to said arm at point 88, and which is controlled by a spring 89 to permit a resilient motion of said extension in the direction the molding drum is moving when said arm 83 is moved in towards the drum. The extension 87 is provided with a square opening 90 therein at its outer end. Pivotally secured to the arm 83 at 91 is one end of an operating lever 92. The other end of said lever is formed with a cage box member 93 (see Figure 3) which is provided with an opening therein which extends around the shaft U. Mounted on shaft U and positioned within the cage box is a cam which revolves with the shaft and hits the sides of the cage box to cause a rocking motion to be imparted to lever 92. The movement imparted to lever 92 causes the discharging mechanism to move at timed intervals towards and from the molding mechanisms mounted on the drum body.

Secured to the arm 83, is a pin 86, which is positioned so that it will ride up the inclined plane 94 of a cam 95, as the discharge mechanism travels inwardly towards the molding mechanism on the drum body. The cam 95 is pivoted at 96 on a pin 97 which extends through guideway 82. Secured to the pin 97 is a spring 98 which tends to rotate pin 97 and thus holds the cam 95 under tension as the pin 86 travels across the same. The pin 86 as it moves up the inclined plane 94 of the cam, during the movement of the discharging mechanism toward the molding mechanism, causes the arm 83 to raise upwardly and to raise its extension 87 above the top edge of the sleeve 54 of the molding cylinder 52, which at that time is holding a molded plug therein. When the pin 86 drops off the cam at the end of the forward travel of the arm 83, the said arm 83 drops down and its slotted extension 87 drops down over the plug body positioned in the sleeve 54.

Mounted on the guideway 81, is a supporting member 99 which is provided with slots 100 and 101 therein. Pivotally mounted in slot 100 is a lever arm 102 which is provided with a roller 103 at its lower end. The roller 103 rides along the bottom face of arm 83. Mounted in the lever arm 102 is a pin 104, which extends upwardly through the slot 101. The pin is provided with a spring 105, which acts to force lever arm 102 and its roller 103 downwardly on the arm 83 and so that when its slotted extension 87 is positioned over the molded plug it will grasp the plug when lever arm 102 is dropped downwardly after the pin 86 drops off the end of cam piece 95.

When the extension 87 of arm 83 grasps the molded plug body positioned on the sleeve 54 and draws it from said sleeve, the discharging mechanism is then returned to its initial position by lever 92 by reason of the action of the cam in the cage box 93. As the extension 87 of arm 83 grasps the plug body it draws the same up a gangway piece 106 which is secured to a support on the machine indicated at 107.

Figure 18:
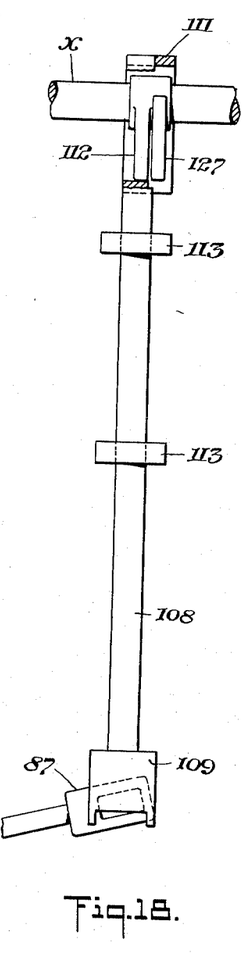
Figure 19:
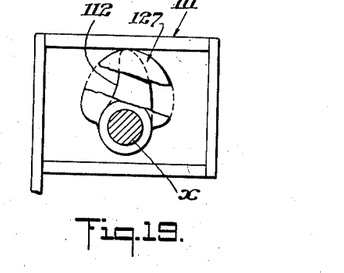
Figure 19 is a detail view of the eccentric operating the ejector means.
Figure 20:
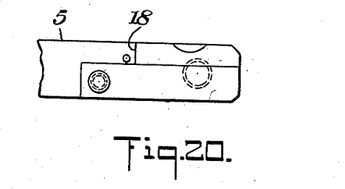
Figure 20 is an inverted detail view of the gate under the charging plunger of the feeding mechanism.
Figure 21:
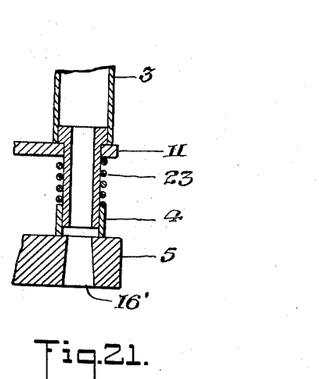
Figure 21 is a detail view of the end of the hopper feeding tube.

It is to be noted that when the force piece 55 is withdrawn from the molded plug body and just before said plug body is grasped by the extension 87 of the arm 83, the plug body is in a semi-molded state and it expands slightly due to the undercuts made therein. However, when the plug body becomes positioned in the slot formed in the extension 87 of arm 83 the said slot functions to reform said plug to its required size and shape and so that it will be accurately flashed and punched as hereinafter explained. At the time the plug body is being drawn up the gangway piece 106, a lever 108, having at its end a pusher member 109 (see Figures 12, 17 and 18) is caused to be moved towards the extension piece 87, and to push the molded plug into a discharge chute 110 from which it is discharged into a suitable receptacle positioned beside the machine.

Figure 3:
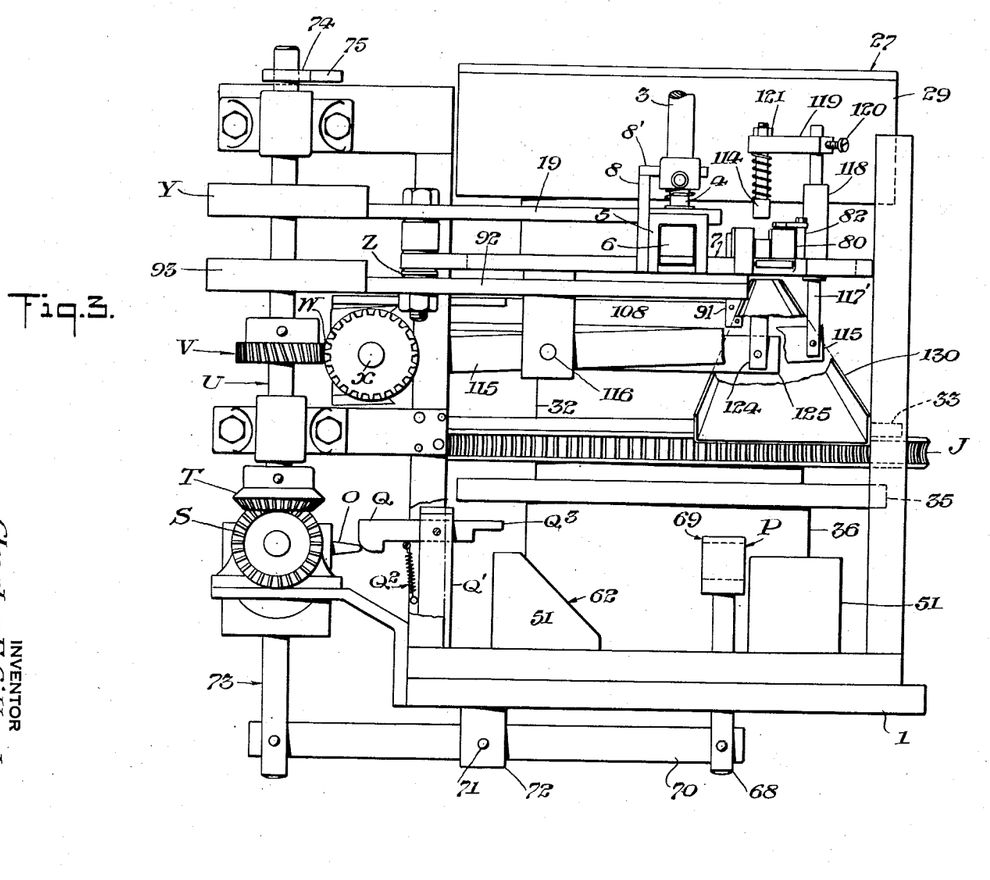
Figure 3 is a front elevation of the machine.
Figure 4:
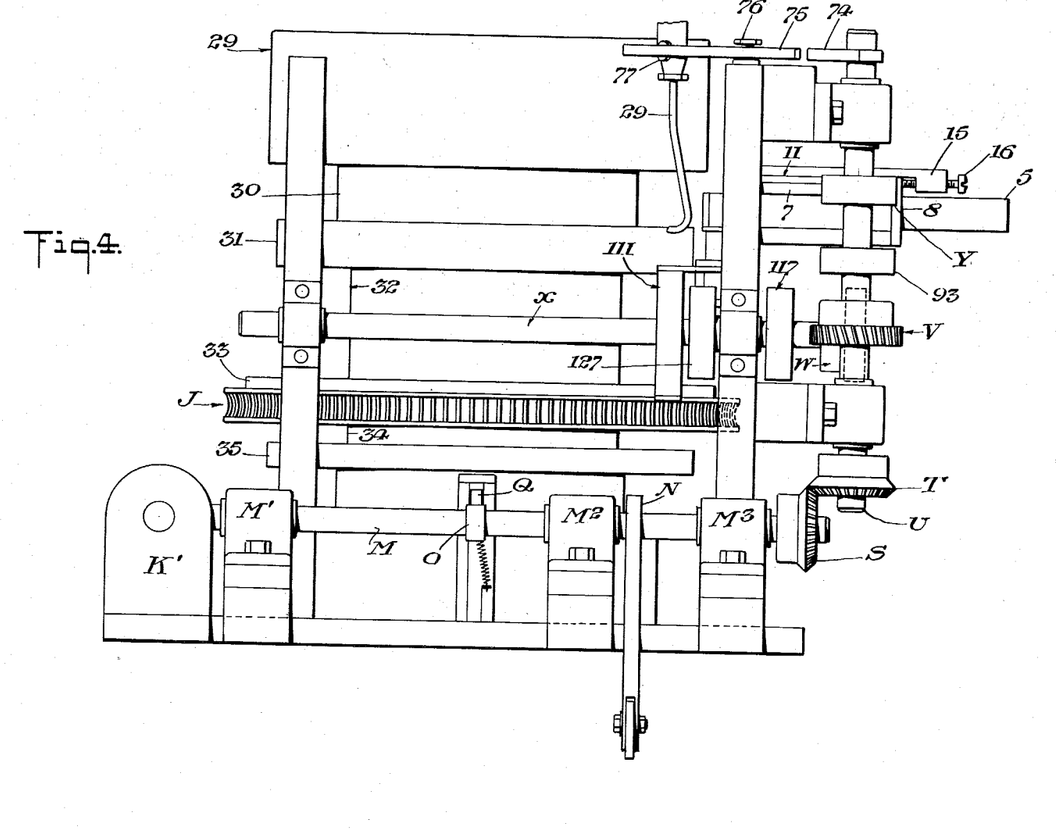
Figure 4 is a view in elevation of the left hand side of the machine and showing the main driving shafts thereof.

The lever 108 extends across the front of the machine as shown in Figure 3 and is attached to a follower cage box 111 in which is positioned a cam 112. The cam 112 is mounted on the shaft X. The action of the cam 112 hitting the sides of the follower cage box 111 imparts a sliding motion to lever 108 and causes the pusher member 109 thereof to push the molded plug body from the extension 87, of arm 83, at predetermined timed intervals. The lever 108 is slidingly supported in suitable guideways 113 secured to the supporting framework of the machine.

After the plug body has been molded, and during the time it is being removed from the molding mechanism by the discharging mechanism as above described, a hole is caused to be punched therethrough which is adapted for the reception of an electrical conductor. The punching of the hole is accomplished by a punching mechanism which will now be described and which is associated with the discharging mechanism. This punching mechanism is more clearly illustrated in Figures 9, 10 and 11 of the drawings and is indicated generally by the numeral 114. The mechanism is pivotally secured to one end of a lever 115 (see Figures 9 and 12). The lever 115 is pivoted at 116 to a support or the framework of the machine. The lever is provided at its other end with a follower cage box 117. Positioned in the follower cage box is a cam which is secured to shaft X and the operation of the cam in the follower cage box causes the lever 115 to move up and down on pivot 116. The lever 115 at its other end is pivoted to a lever 117' which slidingly extends upwardly through a support 118 secured to the framework of the machine. The upward end of lever 117' is provided with an arm 119 adjustably secured thereto by a screw 120. Secured to the arm 119 and held thereto by a nut 121, is a rod 122 which is provided at its lower end with a punch member 114. Surrounding the punch member 114 is a cup member 123 adapted to fit over the top end of the molded plug. The cup member is slidingly supported on the rod 122 and movement thereof with respect to said rod is controlled by a spring 124.

The operation of the punch mechanism causes the punch 114 to descend at predetermined intervals and punch a hole in the molded plug body as it is drawn up the gangway 106.

At the time the punch member 114 is caused to be moved upwardly after it has punched a hole in the plug body, another punch 124' at the upper end of lever 124" which in turn is attached to one end of a lever 125 comes into action. The lever 125 is also pivotally secured at 116, and its other end is provided with a follower cage box 127 (see Figure 4). Positioned in said follower cage box is a cam which is secured to shaft X, and its motion in the follower cage box causes an up and down motion to be imparted to lever 125 around the pivot 116 and said lever in turn imparts movement to the punch lever 124" which is slidingly supported in the bracket 128 which holds the gangway piece 106 on the supporting framework of the machine. The punch is designed to flash off the molded plug body just prior to the time it is discharged from the machine. The waste material resulting from the flashing operation is carried off in a chute 130.

Figures 23, 24, 25:
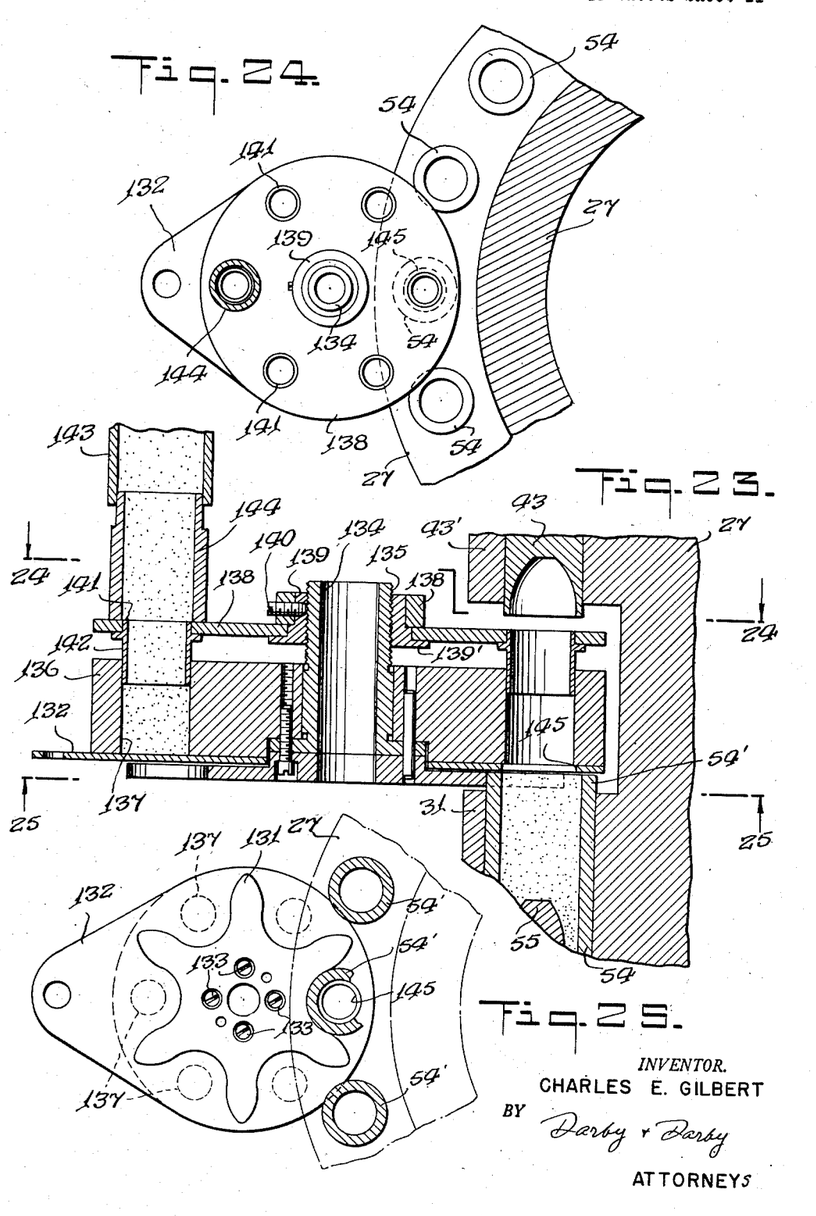
Figure 23 is a vertical cross-sectional view of a portion of the apparatus showing a modified form of raw material loading mechanism.
Figure 24 is a fragmentary cross-sectional view, taken along line 24—24 of Figure 23.
Figure 25 is a fragmentary cross-sectional view, taken along line 25—25 of Figure 23.

Figures 23 to 25 illustrate a modified form of molding chamber loading mechanism adapted for use either to load a predetermined charge of molding powder into each of the molding chambers or to supply a pellet of molding material (which may, for example, be formed by compressing a predetermined amount of powder) to each molding chamber. This mechanism has a distinctive feature that its synchronism with the progression of the molding chambers is assured by directly driving the loading mechanism by the molding chambers themselves.

Shown in these figures is the same drum 27 which is illustrated in the preceding figures. As shown above this drum 27 carries a plurality of molding chambers formed by sleeve member 54, force piece 55 and die member 43. At the loading position and also at the preceding discharging position the force piece 55 and die member 43 are most widely separated. As shown in Figure 23, sleeve member 54 in this position extends slightly above the intermediate section 31 of the drum 27 in which the sleeve member 54 is slidably mounted. It is the projection 54' of the sleeve member 54 which is used to actuate the loading mechanism. For this purpose a star wheel 131 is rotatably mounted on a mounting plate 132 which is fixed in any suitable manner to the base of the mechanism. The star wheel 131 is shown as having six teeth, although any desired number may be used, and has a contour conforming to the sleeve projection 54' and is in engagement therewith so that as the drum 27 rotates the sleeve projections 54' successively engage the teeth of the star wheel 131 to rotate the star wheel 131 in perfect synchronism with the advancement of the successive molding chambers. Fixed to the star wheel 131, as by a series of screws 133 or other suitable means, is a sleeve 134 externally threaded at its upper end 135. Also fixed to the star wheel 131 and sleeve 134 is a loading plate 136 which has a series of bores 137 extending axially thereof and in register with the space between the teeth of the star wheel 131, as shown most clearly in Figure 25. The loading plate 136 is provided with a loading plate extension in the form of a plate member 138 which is rotatably mounted in the threaded hub member 139 but is kept from axial movement with respect thereto by the shoulder 139' and the retainer 138'. It will be apparent that rotating hub 139 relative to the sleeve 134 will vary the separation of plate extension 138 with respect to the loading plate 136. The position of plate member 138 relative to loading plate 136 may be maintained by a set screw 140 which retains the hub 139 in fixed position relative to the sleeve 134.

Plate member 138 is provided with apertures 141 which are in register with the bores 137 of loading plate 136. Each aperture 141 of the loading plate extension is provided with a thin walled cylindrical bore extension 142 which slidably engages the corresponding bore 137 of the loading plate 136. The volume enclosed by the bore 137 and the cylindrical extension 142 determines the charge of molding powder to be supplied to the molding chambers, and by adjusting the separation between loading plate extension 138 and loading plate 136, the size of this loading chamber can be adjusted to provide the required amount of molding powder. However, in use, once this adjustment is made for the particular article to be molded, it is left fixed.

The molding powder to be supplied to the molding chambers is retained in the suitable hopper, not shown, connected at the remote end of a supply chute 143. At the end of supply chute 143 is a supply sleeve 144. It will be understood that both supply chute 143 and supply sleeve 144 are stationary relative to the loading plate 136 and its extension 138 which rotate with the star wheel 131. The supply sleeve 144 however is axially slidable within the supply chute 143 and is resiliently urged by any suitable means (not here shown) against the top surface of the plate member 138. The bore of sleeve 144 is slightly larger than the aperture 141 of the plate member 138 and surrounds aperture 141.

The operation of this loading mechanism will now be readily apparent. As the star wheel 131 is driven by the loading chamber sleeves 54, the loading apertures 141 successively come under the end of the supply sleeve 144 and each receives a charge of molding powder therefrom. The end of sleeve 144 slides over the plate 138 and levels off the charge of molding powder within the bore 137. The loading plate 136 and its extension 138 then continue to rotate until the charge of powder is positioned over the sleeve member 54 of the molding chamber, the powder charge being retained in the bore 137 by virtue of the stationary plate 132. Plate 132 has a single aperture 145 which is in register with the sleeve 54 when in the loading position. When the bore 137 is rotated to this loading position, it registers with the aperture 145 and the charge of molding powder is permitted to descend into the molding chamber. Thereafter, the loaded molding chamber progresses through the subsequent stages or stations described above to go through the cycle of operations already described which produces the finished product.

It will be understood that a supply of pellet charges can be used rather than powder, in which case such pellets will descend through the supply chute 143 and sleeve 144 to the charging chambers 137. When pellets are used the loading plate extension 138 may be eliminated since any adjustability in the desired loading charge can be obtained by change in size of the pellet.

It will be appreciated that this modified loading mechanism offers considerable advantage in respect to simplicity of construction and reliability of operation, since it is necessarily driven in synchronism with the molding chambers and supplies a constant charge to the empty molding chambers exactly when needed, by virtue of its drive from the molding chamber sleeves 54 themselves.

From the above description it will be apparent that there is provided a machine which is adapted to automatically produce molded plug bodies by a combination of mechanisms which operate in timed relation with respect to each other and said machine is designed for continuous production of said plug bodies.

It will be understood that the specific description of the machine heretofore given is solely for the purpose of explaining the nature of my invention and that the invention is not limited in any way thereby, but said machine is susceptible to many modifications in detail without departing from the scope of my invention. It is also to be understood, as already stated, that the invention is not limited to a machine for molding plug bodies of the kind described, but is also adapted to a machine for producing molded plastic articles of many different kinds and types.

What is claimed is:

1. A machine for making molded plastic articles comprising a plurality of molding mechanisms for molding said articles of a predetermined design and construction each of said molding mechanisms having a die member for shaping the exterior of the article and a force member for shaping the interior of said article, mechanism for feeding molding material to each of the molding mechanisms at predetermined intervals during the operation of the machine and when said force member is in non-operating position with respect to the die member, mechanism for causing the removal of the articles from said molding mechanisms after they have been molded thereby and when the material thereof is in a semiplastic condition, means associated with said removing mechanism for accurately reforming the semi-plastic molded articles into their final size and shape after they are removed from the molding mechanism, mechanism for flashing said molded articles after they have been removed from the molding mechanisms, mechanism for discharging the completed molded articles from the machine, and mechanisms for operating the molding, feeding, removing, flashing and discharging mechanisms in timed relation to each other.

2. A machine for making hollow molded plug bodies for use in constructing electrical connectors comprising a rotatable heated drum having a hollow top section, a plurality of molding mechanisms mounted around and rotating with said drum, and each having a die member associated therewith for shaping the plug body slidingly mounted on rods supported by the top section of the driven body and resiliently held against movement on said rods by spring means, and a molding unit including a force member positioned to cooperate with said die member for forming molded recesses within the plug body during the molding operation, mechanism for feeding molding material in predetermined quantities to each molding mechanism and at predetermined intervals during the rotation of said drum and when said force member is in non-operating position with respect to the die member, mechanism for removing the plug bodies from the molding mechanisms after they have been molded in a semi-plastic condition, means associated with said removing mechanism for reforming said semiplastic molded plug bodies to their final shape and size, mechanism for punching a hole in the molded plug bodies and for flashing the said bodies after they have been removed from the molding mechanisms, mechanism for causing the discharge of the completed molded plug bodies from the machine, and means for rotating the drum and for operating the molding mechanisms and the feeding, removing, punching, flashing and discharging mechanisms in timed relation to each other and so as to provide a continuous automatic operation of the machine.

3. A machine for making hollow molded plug bodies for use in constructing electrical connectors comprising a rotatable heated drum having a hollow top section, a plurality of molding mechanisms mounted around the sides of the drum and including a pair of coperating units consisting of a die member resiliently mounted in the hollow top section of the drum and a movable molding member for forming recesses on the interior of the plug body during the molding thereof, means for heating said drum and molding mechanisms, means for operating said cooperating units of the molding mechanisms so that they will automatically and at timed intervals be brought into and out of molding relation with respect to each other as the molding mechanisms rotate with said drum, means for feeding molding material to one of said units of the molding mechanism when it is out of molding relation with respect to the other unit, means for removing the plug bodies from the molding mechanisms after they have been molded, means for punching a hole in the molded plug bodies and for flashing said bodies as they are being removed from the molding mechanisms, means for discharging the completed plug bodies from the machine, and means for automatically operating the feeding, removing, punching and flashing and discharging means in timed relation to the operation of the molding units of the molding mechanisms and to the rotation of the drum.

4. A machine for molding hollow plug bodies for use in constructing electrical connectors comprising a heated rotatable drum, means for rotating the drum, a plurality of molding mechanisms mounted around the sides of said drum and rotating therewith, each of said molding mechanisms including a die member and a molding member having a hollow sliding sleeve with a force member slidingly positioned therein, means for automatically and at timed intervals causing said sleeves to be moved into and out of molding relation with respect to said die members and for causing said force members to be moved from said sleeves into said die members during the molding operation and away from said die members and into said sleeve after the molding of the plug bodies have been completed, means for feeding molding material to the molding mechanisms during the time said sleeve and force member is withdrawn from said die member, means for removing the molded plug bodies from said sleeves after the molding operation has been completed, means for punching a hole in the molded plug bodies and for flashing said bodies after they have been removed from said sleeves, means for causing the completed plug bodies to be discharged from the machine, and means for automatically operating the feeding, removing, punching, flashing and discharging means in timed relation to each other and to the operation of the molding mechanisms.

5. A machine for molding hollow plug bodies for use in constructing electrical connectors comprising a heated rotatable drum, means for rotating said drum, a plurality of molding mechanisms mounted around the sides of said drum and rotating therewith, each of said mechanisms including a die member and a molding unit including a force member slidingly positioned in a sleeve and having a roller mounted on the lower end thereof, a stationary runway positioned around the base of said drum and upon which the rollers of said force members travel, a cutaway portion in said runway across which said force members and their rollers ride during the rotation of the drum, means for pulling said force members down into their sleeves and for also pulling said sleeves away from the die members as said force members ride across said cutaway portion, means for feeding molding material to a sleeve of a force member as it travels across said cutaway portion, an inclined cam surface formed in said runway adjacent said cutaway portion for causing said force members and their sleeves to be simultaneously advanced upwardly into molding relation with the die members after the force members and their rollers have passed across said cutaway portion, means to pull a force member and its sleeve momentarily down from a die member after it has been positioned in molding relation therewith to permit gas which may have accumulated in the die member to escape, means for removing the plug bodies from the molding mechanisms after the molding process has been completed, means for punching a hole in the molded plug body and for flashing the same, means for causing the molding mechanism, the several pull down means, and the feeding, removing, punching, flashing and discharging means to operate in timed relation to each other as the molding mechanisms rotate with said drum.

6. A machine for making hollow molded plug bodies for use in constructing electrical connectors comprising a rotatable heated drum, a plurality of molding mechanisms mounted around the sides of said drum and rotating therewith for molding said plug bodies, said molding mechanisms including a die member resiliently mounted on said drum and a molding member slidingly cooperating with said die and adapted to mold the interior of said plug bodies, mechanism for feeding molding material to said molding mechanisms at a predetermined time during their operation, said mechanism comprising a slidable feeding bar adapted to be moved towards and from the molding mechanisms at timed intervals and having an aperture through its feeding end and a feeding hopper containing molding material slidingly supported thereon, said feeding hopper being positioned on said bar so that it will deliver its charge of molding material through said aperture in the feeding bar, and to the molding mechanism, when said bar aperture has been moved into registering position with respect to the molding mechanism and will refill with molding material when said bar is moved away from said molding mechanism, mechanism for removing the plug bodies from the molding mechanisms after they have been molded, mechanisms for punching a hole in the molded bodies and for flashing said bodies as they are being removed, discharging mechanism for discharging the completed plug bodies from the machine, mechanism for rotating the drum, and for operating the molding mechanisms, the feeding, removing, punching, flashing and discharging mechanisms in timed relation to each other and to the rotating movement of the drum.

7. A machine for making hollow molded plug bodies for use in constructing electrical connectors comprising a rotatable heated drum, a plurality of molding mechanisms mounted around the side of said drum and rotating therewith for molding said plug bodies, said molding mechanisms including a die member resiliently mounted on said drum and a molding member slidingly cooperating with said die and adapted to mold the interior of said plug bodies, mechanism for feeding molding material to said molding mechanisms at predetermined intervals during their operation, mechanism for removing the plug bodies from the molding mechanisms after they have been molded and are in a plastic state, said mechanism comprising a pair of sliding arms pivotally connected together and slidably maintained in a guide way secured to the machine frame, one of said arms having a mounted extension with an aperture therethrough and which is adapted to be moved toward the molding mechanisms, cam means associated with said mechanism for causing said arm with the pivoted extension thereon to raise upwardly as it is moved inwardly towards the molding mechanism and so that its aperture will be positioned over a molded plug body in said molding mechanism and to lower over said plug and remove the same from said molding mechanism as the sliding arms are moved away from said molding mechanism, mechanism for punching a hole in the molded plug bodies and mechanism for flashing said bodies as they are being removed from the molding mechanism by the removing mechanism, means for discharging the completed plug bodies from the machine, mechanism for rotating the drum and for operating the molding mechanisms, the feeding, removing, punching, flashing and discharging mechanisms in timed relation to each other and to the rotating movement of the drum.

8. A machine for making hollow molded plug bodies for use in constructing electrical connectors comprising a rotatable heated drum, a plurality of molding mechanisms mounted around the side of said drum and rotating therewith for molding said plug bodies, said molding mechanisms including a die member resiliently mounted on said drum and a molding member slidingly positioned with respect to said die member and adapted to mold the interior of said plug bodies, mechanism for feeding molding material to said molding mechanisms at predetermined intervals during their operation, mechanism for removing the plug bodies from the molding mechanisms along a predetermined path after they have been molded and while said bodies are in a plastic state, mechanism for punching a hole in the molded plug bodies as they are being removed from the molding mechanisms, said mechanism comprising a punch member which is slidingly supported above said path followed by the plug body as it is being removed from the molding mechanisms by the removing mechanism, and which is adapted to be moved downwardly on said plug body and punch a hole through the top end thereof, mechanism for flashing the plug bodies after they have been punched by said punching mechanism, mechanism for causing the plug body to be discharged from the machine after said punching and flashing operation, and mechanism for rotating the drum and for operating the molding mechanisms, the feeding, removing, punching, flashing and discharging mechanisms in timed relation to each other and to the rotation of the drum.

9. A machine for making hollow molded plug bodies for use in constructing electrical connectors comprising a rotatable heated drum, a plurality of molding mechanisms mounted around the side of said drum and rotating therewith for molding said plug bodies, said molding mechanisms including a die member resiliently mounted on said drum and a molding member slidingly positioned to cooperate with said die member and adapted to mold the interior of said plug bodies, mechanism for feeding molding material to said molding mechanisms at predetermined intervals during their operation, mechanism for removing the plug bodies from the molding mechanisms after they have been molded and while they are in semi-plastic state, mechanisms for punching a hole in the molded plug bodies as they are being removed from the molding mechanisms, mechanism for flashing the plug bodies after they have been punched by said punching mechanism, said flashing mechanism being comprised of a flashing means slidably supported below the punching mechanism and adapted to be moved upwardly to flash the plug as said punching mechanism is moving upwardly away from the plug body after punching a hole in it, mechanism for causing the plug bodies to be discharged from the machine after said flashing mechanism has operated on the same, and mechanism for rotating the drum and for operating the molding mechanisms, the feeding, removing, punching, flashing and discharging mechanisms in timed relation to each other and to the rotation of the drum.

10. A machine for making hollow molded plug bodies for use in constructing electrical connectors comprising a plurality of molding mechanisms for molding said plug bodies and for forming predetermined molded recesses therein, each of said molding mechanisms including a die member and a molding member including a force member adapted to slidingly enter said die member to form the molded recesses in the interior of said plug body, mechanism for feeding molding material to each of the molding mechanisms at predetermined intervals during the operation of the machine and when said force member is withdrawn from said die member, mechanism for causing the removal of the plug bodies from said molding mechanisms after they have been molded thereby and when the material thereof is in a semi-plastic condition, means associated with said removing mechanism for accurately forming the molded plug bodies into their required final size and shape after they are removed from the molding mechanisms, mechanism for flashing said bodies as they are being removed from the molding mechanism and for punching a hole in the same, mechanism for causing the discharge of the completed bodies from the machine, and mechanism for operating said feeding, molding, removing, punching, flashing and discharging mechanisms in timed relation to each other.

11. A machine for molding hollow plug bodies for use in constructing electrical connectors comprising a rotatable heated drum having a hollow top section, a plurality of molding mechanisms positioned around said drum and slidingly mounted with respect thereto, each mechanism including a hollow sleeve with a force member slidingly positioned therein, and one of a plurality of die members resiliently mounted around the circumference of the hollow top section of said drum and positioned so that they will cooperate with said sleeves and force members to perform the molding operation, means for causing said molding mechanism sleeves and force members to be moved into operative position with respect to said die members and to withdraw the same therefrom at predetermined intervals during the rotation of said drum, mechanism for feeding molding material to each of said molding mechanisms when they are out of operative engagement with respect to said die members, mechanism for removing the molded plug bodies from said molding mechanisms, a punch mechanism for providing a hole through said plug body as it is being removed from said molding mechanism, mechanism for flashing the molded plug bodies after they have been punched by said punching mechanism, mechanism for discharging the molded plug bodies from the machine and mechanism for effecting the operation of the several mechanisms of the machine in timed relation to each other and so that said plug bodies may be molded in a continuous operation of the machine.

12. A machine for molding hollow plug bodies for use in constructing electrical conectors comprising a rotatable heated drum, a plurality of molding mechanisms positioned around said drum and slidingly mounted with respect thereto including a plurality of die members resiliently mounted around said drum and adapted to shape the exterior of said plug bodies, a force member movably slidably adapted to enter each of said die members for shaping the interior of said plug body, means operated by the rotation of said drum for causing said force members to be moved into operative relation with respect to said die members and to withdraw the same therefrom at predetermined intervals, mechanism for feeding molding material to said molding mechanisms during the rotation of said drum and when said force members are out of engagement with said die members, mechanism for withdrawing said force members from said die members after the plug bodies have been molded into a semi-plastic condition, mechanism for removing the semi-plastic molded plug bodies from the molding mechanisms, said mechanism having means associated therewith for accurately reforming the semi-plastic molded plug bodies into their final shape and size, mechanism for flashing said molded plug bodies after they have been removed from the molding mechanisms, and mechanism for discharging the completed molded plug bodies from the machine.

13. A machine for molding hollow plug bodies for use in constructing electrical connectors comprising a hollow rotatable drum having means mounted therein for supplying heat thereto, means for rotating said drum, a plurality of die members resiliently mounted around the upper portion of said drum, a plurality of molding devices slidingly supported around the periphery of said drum and adapted to engage with said die members to mold said plug bodies, said molding devices each being comprised of a hollow sleeve having a cylinder slidingly positioned therein provided with a force piece at its upper end which is adapted to be projected into a die member when the molding of a plug body is performed, rollers secured to the lower ends of said cylinders of said molding devices, a camway positioned around the base of said drum and upon which said rollers travel, said camway being formed with surface sections which cause said cylinders of said molding devices and the force pieces associated therewith to move into and out of engagement with said die members at predetermined intervals, mechanism for feeding molding material to said molding devices at predetermined intervals during the rotation of said drum and at a time when said devices are out of operative engagement with said dies, mechanism for removing the plug bodies from the molding devices after they have been molded, mechanism for flashing said plug bodies after they have been removed from the molding devices, mechanism for discharging the completed molded bodies from the machine, and mechanism for effecting the operation of the several mechanisms and devices of the machine in timed relation to each other.

14. A machine for molding bodies comprising a heated rotatable drum, means for rotating said drum, a plurality of molding mechanisms mounted around the circumference of said drum and rotating therewith, each of said mechanisms including a first molding member and a molding unit including a second molding member slidingly positioned in a sleeve and having a roller mounted on the lower end thereof, a stationary runway positioned around the base of said drum and upon which the rollers of said second molding members travel, a cutaway portion in said runway across which said second molding member rollers ride during the rotation of the drum, means for pulling said second molding members down into their sleeves and for also pulling said sleeves away from the said first molding members as said second molding member rollers ride across said cutaway portion, means for feeding molding material to a sleeve of a second molding member as it travels across said cutaway portions, an inclined cam surface formed in said runway adjacent said cutaway portion for causing said second molding members and their respective sleeves to be simultaneously advanced upwardly into molding relation with the first molding members after the second molding members and their rollers have passed across said cutway portion, means to pull a second molding member and its sleeve momentarily down from a first molding member after it has been positioned in molding relation therewith to permit gas which may have accumulated in the die member to escape, and means for removing the molded bodies from the molding mechanisms after the molding process has been completed.

15. A machine for molding bodies comprising a heated rotatable drum, means for rotating said drum, a plurality of molding mechanisms mounted around the circumference of said drum and rotating therewith, each of said mechanisms including a first molding member and a molding unit including a second molding member slidingly positioned in a sleeve and having a roller mounted on the lower end thereof, a stationary runway positioned around the base of said drum and upon which the rollers of said second molding members travel, a cutaway portion in said runway across which said second molding member rollers ride during the rotation of the drum, means for pulling said second molding members down into their respective sleeves and for also pulling said sleeves away from the said first molding members as said second molding member rollers ride across said cutaway portion, means for feeding molding material to a sleeve of a molding unit as its roller travels across said cutaway portion, an inclined cam surface formed in said runway adjacent said cutaway portion for causing said second molding members and their respective sleeves to be simultaneously advanced upwardly into molding relation with the first molding members after said rollers have passed across the cutaway portion, and means for removing molded bodies from the molding mechanisms after the molding process has been completed.

16. A machine for molding bodies comprising a heated rotatable drum, means for rotating said drum, a plurality of molding mechanisms mounted around the circumference of said drums and rotating therewith, each of said mechanisms including a first molding member and a second molding member having a roller pivotally mounted on the lower end thereof, a stationary runway positioned around the base of said drum and upon which said rollers travel, said runway having a cutaway portion across which said rollers ride during the rotation of said drum, means for pulling said second molding members away from said first molding members as said rollers ride across said cutaway portion, means for feeding molding material to each said mechanism as its roller travels across said cutaway portion, an inclined cam surface formed in said runway adjacent said cutaway portion for cusing said rollers and their respective second molding members to be advanced upwardly into molding relation with the first molding members after said rollers have passed across said cutaway portion, and means for removing molded bodies from the molding mechanisms after the molding process has been completed.

17. A machine for making hollow molded bodies comprising a rotatable heated drum, a plurality of molding mechanisms mounted around the circumference of said drum and rotating therewith for molding said bodies, said molding mechanisms comprising a first molding member mounted on said drum and a second molding member slidingly cooperating with said first member to mold said bodies, and mechanism for feeding powdered molding material to said molding mechanisms at a predetermined time during their operation, said mechanism comprising a slidable feeding bar adapted to be moved towards and from the molding mechanisms at timed intervals and having an aperture through its feeding end and a feeding hopper containing molding material slidingly supported thereon, said feeding bar having a bottom cover plate slidably mounted thereon under said aperture to form a charge-retaining cavity, said feeding hopper being positioned over said bar so that it will deliver a charge of molding material into said cavity in the feeding bar when said bar aperture has been moved away from said molding mechanism, said cover plate being in the path of each of said molding mechanisms as it passes a loading position, when said feeding bar has been advanced toward said molding mechanism loading position, whereby said bottom cover plate is adapted to be swung out of position by each molding mechanism as it assumes its loading position to drop a charge of said material from said aperture into said molding mechanism.

18. A machine for making molded bodies comprising a rotatable heated drum, a plurality of molding mechanisms mounted around the outside of said drum and rotating therewith for molding said bodies, said molding mechanisms each including a first molding member mounted on said drum and a second molding member slidably positioned with respect to said first member and adapted to mold the body, mechanism for feeding molding material to said molding mechanisms at predetermined intervals during their operation, and mechanism for removing the plug bodies from the molding mechanisms after they have been molded, said latter mechanism comprising a pair of sliding arms pivotally connected together and slidably maintained in a guide way secured to the machine frame, one of said arms having a pivoted extension with an aperture therethrough and which is adapted to be moved toward the molding mechanisms, cam means associated with said mechanism for causing said arm with the pivoted extension thereon to raise upwardly as it is moved inwardly towards the molding mechanism and so that its aperture will be positioned over a molded body in said molding mechanism and to lower over said body and remove the same from said molding mechanism as the sliding arms are moved away from said molding mechanism, mechanism for rotating the drum and for operating the molding mechanisms and the feeding and removing mechanisms in timed relation to each other and to the rotating movement of the drum.

19. A machine for making molded bodies comprising a rotatable heated drum, a plurality of molding mechanisms mounted around the outside of said drum and rotating therewith for molding said bodies, said molding mechanisms comprising a first molding member mounted on said drum and a second molding member slidingly positioned with respect to the first member and adapted to mold said bodies, mechanism for feeding molding material to said molding mechanisms at predetermined intervals during their operation, mechanism for removing the molded bodies from the molding mechanisms along a predetermined path after they have been molded and while said bodies are in a semi-plastic state, mechanism for punching a hole in the molded bodies as they are being removed from the molding mechanisms, said latter mechanism comprising a punch member which is slidingly supported above said path followed by the body as it is being removed from the molding mechanisms by the removing mechanism, and which is adapted to be moved downwardly on said body and to punch a hole through the top end thereof, mechanism for causing the body to be discharged from the machine after said punching operation, and mechanism for rotating the drum and for operating the molding mechanisms, the feeding, removing, punching, and discharging mechanisms in timed relation to each other and to the rotation of the drum.

20. A machine for making molded bodies comprising a rotatable heated drum, a plurality of molding mechanisms mounted around said drum and rotating therewith for molding said bodies, said molding mechanisms comprising a first molding member mounted on said drum and a second molding member slidingly positioned to cooperate with said first member to mold said bodies, mechanism for feeding molding material to said molding mechanisms at predetermined intervals during their operation, mechanism for removing the plug bodies from the molding mechanisms along a predetermined path after they have been molded, and mechanism for removing flashing from the molded bodies after they have been removed from said molding mechanism, said flashing removing mechanism comprising means having an opening conforming to the outline of said bodies and adapted to be slidably moved to a position along said path where it may be placed around said bodies, and mechanism for rotating the drum and for operating the molding mechanisms, the feeding, removing and flashing mechanisms in timed relation to each other and to the rotation of the drum.

21. A machine for making hollow molded bodies comprising a plurality of molding mechanisms for molding said bodies and for forming predetermined molded recesses therein, each of said molding mechanism including a die unit and a molding member including a force member adapted to slidingly enter said die member and to form the molded recess in the interior of said body, mechanism for feeding molding material to each of the molding mechanisms at predetermined intervals during the operation of the machine and when said force member is withdrawn from said die member, mechanism for causing the removal of the bodies from said molding mechanisms after they have been molded thereby and when the material thereof is in a semi-plastic condition, means associated with said removing mechanism for accurately forming the molded bodies into their required final size and shape after they are removed from the molding mechanisms, mechanism for causing the discharge of the completed bodies from the machine, and mechanism for operating said feeding, molding, removing, and discharging mechanisms in timed relation to each other.

22. A machine for molding hollow bodies comprising a rotatable heated drum, a plurality of molding mechanisms positioned around said drum and slidingly mounted with respect thereto and including a plurality of die members resiliently mounted around said drum for shaping the exterior of said bodies, each molding mechanism also including a force member slidably adapted to enter a respective one of said die members for shaping the interior of said bodies, means operated by the rotation of said drum for causing said force members to be moved into operative relation with respect to said die members and to withdraw the same therefrom at predetermined intervals, mechanism for feeding molding material to said molding mechanisms during the rotation of said drum and when said force members are out of engagement with said die members, mechanism for withdrawing said force members from said die members after the bodies have been molded into a semi-plastic condition, mechanism for removing the semi-plastic molded bodies from the molding mechanisms, said mechanism having means associated therewith for accurately reforming the semi-plastic molded plug bodies into their final shape and size, and mechanism for discharging the completed molded bodies from the machine.

23. A machine for molding bodies comprising a rotatable drum having a plurality of molding mechanisms mounted therearound and adapted for sequential operation in timed relation to rotation of said drum, each mechanism comprising two separable portions, one of said portions defining a loading chamber at one station by which said drum passes, with said two portions separated, and means for loading a charge of molding material in said chamber at said station in timed relation to movement of said molding mechanisms by said station, comprising a star wheel activated directly by said molding mechanisms, a fixed plate having an aperture over said loading chamber at said station, a rotatable loading plate having a plurality of open-bottom charging chambers movable successively into register with said aperture, said loading plate sliding on said fixed plate to retain material in said charging chambers except when a charging chamber registers with said aperture, said loading plate being coupled to said star wheel to be driven thereby, and a material chute positioned over said loading plate at a position where said charging chambers pass successively therebeneath, whereby said charging chambers are successively loaded with said material before discharging said material through said aperture to said loading chambers.

24. Apparatus as in claim 23, further including an extension plate rotatable with said loading plate and having apertures registering with said charging chambers, and cylindrical extensions between said latter apertures and chambers, said extension plate being axially adjustable relative to said loading plate to adjust the effective size of said charging chambers.

References Cited in the file of this patent

UNITED STATES PATENTS

| | | |
|---|---|---|
| 1,607,389 | Claus | Nov. 16, 1926 |
| 1,648,721 | Claus | Nov. 8, 1927 |
| 1,846,999 | Eaton | Feb. 23, 1932 |
| 1,965,732 | Bisterfeld | July 10, 1934 |
| 2,150,097 | Gunderson | Mar. 7, 1939 |
| 2,160,805 | Winegar | June 6, 1939 |
| 2,209,404 | Lassman | July 30, 1940 |
| 2,235,111 | Potoezky | Mar. 18, 1941 |
| 2,304,141 | Bergmann | Dec. 8, 1942 |
| 2,398,227 | Hubbert | Apr. 9, 1946 |
| 2,445,742 | Hoch | July 20, 1948 |
| 2,452,382 | Long | Oct. 26, 1948 |